Feb. 16, 1954

B. FOX 2,669,388

PREDETERMINED COUNTER SYSTEM

Filed June 5, 1948

BY

Patented Feb. 16, 1954

2,669,388

UNITED STATES PATENT OFFICE 2,669,388

PREDETERMINED COUNTER SYSTEM

Benjamin Fox, New York, N. Y.

Application June 5, 1948, Serial No. 31,231

9 Claims. (Cl. 235—92)

(Granted under Title 35, U. S. Code (1952), sec. 266)

The invention described herein may be manufactured and used by or for the Government for governmental purposes, without the payment to me of any royalty thereon.

My invention relates to predetermined counter systems, particularly of the electronic type. Such systems are used in calculating machines, for frequency division, for timing, for the control or cycling of mechanical processes, etc. Generally, such counter systems comprise a plurality of decade counters arranged in cascade so as to operate in accordance with the decimal system. The maximum count capacity of such a system is $10^n$ where $n$ is the number of decade counters. If the maximum count of the counter system is M, and it is desired to have the counter system provide some control function and recycle itself after a predetermined number of pulses P, the complement count C of the number P is preset into the counter system, so that counting starts with a value of C instead of zero, and when P additional pulses are applied to the counter, the latter reaches a count of M and delivers an output pulse. The output pulse may then be used to provide the desired control function and to recycle the counter by reinserting the initial starting count C into the counter, thus initiating the same cycle of operation over again. It is also possible to sequentially preset different predetermined values C, C′, C″, etc., into the counter to provide alternate counts of $P=M-C$, $P'=M-C'$, $P''=M-C''$, etc. For more detailed descriptions of such counter systems, reference is made to the following publications: (I) John J. Wild, Predetermined Counters, Electronics, March 1947, p. 120; (II) Richard J. Blume, Predetermined Counter, Electronics, February 1948, p. 88; (III) Preset Interval Timer, Electronic Industries, July 1945, p. 97.

In the prior art systems, as exemplified by those disclosed in the above-cited publications, the complement count C is initially inserted into the counter by a series of manually-operated, decimally-related dials or registers calibrated to read directly in terms of the complement count C. Thus, if the maximum count provided by the counter is M, and it is desired to provide a complete cycle of operation after a desired predetermined count P, it is first necessary to subtract P from M to derive the complement number C and then set up the registers to read the number C. This is obviously a cumbersome procedure and subject to errors in calculation.

Attempts to calibrate the registers directly in terms of the desired number P have encountered numerous difficulties. Since the minuend, which represents the full capacity of the counter, is a multiple of ten, difficulties were encountered in providing for the unit carryover into the higher-order digit columns when the lower-order digits in the subtrahend, which is the number P in this case, are other than zero, and at the same time providing for no carryover when the lower-order digits are zero.

It is a principal object of my invention to provide a novel counter of the type above discussed in which the registers are calibrated directly in terms of the desired number of pulses P, thus eliminating the step of calculation of the complement C.

In accordance with my invention, the total stable count capacity of a multi-digit counter system is made $(10^n-1)$, wherein $n$ is the number of decade counters connected in cascade. In such a case, all the digits in the minuend, which represents the full capacity of the system, are made equal to the number 9. Since none of the digits in the subtrahend are greater than nine, no carryover problem is present. The setting means of the registers can therefore be calibrated in terms of the number P, since each register setting inserts into its decade the nine complement of the number indicated by said setting. A particularly important feature of my invention is the simple manner in which the above mode of operation is accomplished. In brief, the invention involves utilizing one or more of counter decades, for counting successively higher denominations of a number, connected in cascade to provide a total count capacity of $10^n$, or more generally $N^n$ as hereinafter explained. Each decade has a settable register to preset the decade to any desired number. A pair of time-spaced pulses are provided, the first pulse being supplied to all the registers to preset each decade to the nine-complement of the number set up on its register, and the second pulse being applied solely to the input of the lowest denomination counter decade, i. e., the units decade. This adds a count of "one" to the total number preset by the registers. In the case of a self-cycling counter, the pair of time-spaced pulses are automatically generated as the counter reaches its highest counting state, i. e., the $10^n$ count condition.

For a better understanding of the invention, together with other and further objects thereof, reference is had to the following description taken in connection with the accompanying drawings, wherein.

Figure 1:
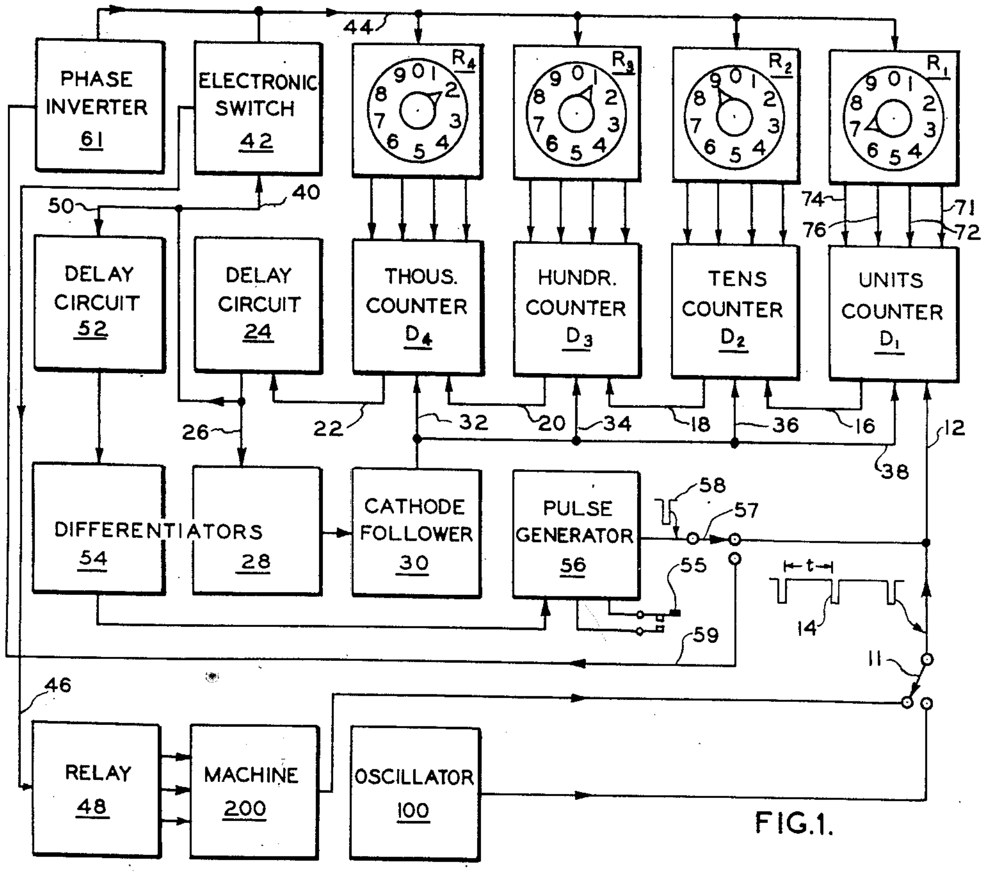
Fig. 1 is a schematic diagram of the invention.

In Fig. 1 there is shown a counter chain comprising any number of decade counters connected in cascade, which would normally provide a total count of $10^n$, $n$ being equal to the number of decades. Merely for the purposes of illustration, four decade counters $D_1$, $D_2$, $D_3$, and $D_4$ are shown for respectively counting units, tens, hundreds, and thousands, and normally providing a maximum count capacity of $10^4$. The counters are connected in cascade, by means of leads 16, 18, and 20 to a lead 12 connected to a source of spaced, negative pulses 14 to be counted. The counters may be of the ring type or the series-connected binary type.

The source of pulses 14 can be either an oscillator 100 or a machine to be controlled 200, shown selectively connectable to lead 12 by a double throw switch 11. Machine 200 is equipped with a generator of pulses which emits a single pulse at every cycle of operation of the machine. The counter system herein is adapted to control the sequence of various machine operations after a predetermined number of machine cycles.

In the normal operation of such a counter system, the pulses to be counted are applied through a lead 12 to the units counter $D_1$ which, at every tenth pulse, applies a single pulse through lead 16 to the tens counter $D_2$. In a similar manner, $D_3$ and $D_4$ are controlled until the final decade has been pulsed to full capacity, which in this case is 10,000 pulses. At the end of the 10,000th pulse all decades are automatically restored to zero count and the cycle is repeated.

To condition the system to operate over a predetermined counting cycle which is less than the full count capacity of the system, in this case less than 10,000 pulses, the output of the last decade $D_4$, which is a single pulse every time the counter system is filled to capacity, is applied through lead 22 to a pulse delay circuit 24, which may be of the retardation line type or the multivibrator type. The output of circuit 24 is applied through lead 26 to a differentiator 28 which, in response to the leading edge of the delayed pulse from circuit 24, provides a sharp positive pulse to a normally-blocked cathode-follower stage 30, the output of which is a positive pulse which is applied through leads 32, 34, 36, and 38 to all the multivibrator stages in counters $D_1$, $D_2$, $D_3$, and $D_4$ to turn off those stages which may be "on."

The pulse in the output of delay circuit 24 is also applied over a lead 40 to an electronic switch 42 which responds only to the lagging edge of the pulse from circuit 24. Electronic switch 42, in turn, supplies a pulse which may be further amplified and applied over an output lead 44 in parallel to ten-position switch registers $R_1$, $R_2$, $R_3$, and $R_4$, which respectively preset the counter decades $D_1$, $D_2$, $D_3$, and $D_4$ to a condition which is the equivalent of the complement of the desired pulse cycle. Hence, when additional pulses equal to said desired number are applied to the counter system over lead 12, the last decade $D_4$ is filled again and delivers a pulse, which initiates a new cycle of operation as above described. Electronic switch 42 can also supply a pulse over a lead 46 to an output relay 48 for the control of the timing or cycling of machine 200. For specific examples and further details of the uses of the system above described reference is made to the publications above cited.

As thus far described the system is conventional, and the specific circuit details of the components described herein can be found in publication (II), supra. As above pointed out, in prior systems of this type the registers $R_1$ to $R_4$ are calibrated in terms of the complement C of the desired predetermined count P.

In accordance with my invention, the registers are designed to read directly in terms of P. Thus, in Fig. 1, the registers $R_1$ to $R_4$ are set to read 2,197. Upon such a setting, the counters will be preset to the complement of the number 2,197, which is the number 7,803. Hence the counter will be full and recycle itself at every 2,197th pulse.

Each of the registers inserts into its decade the nine-complement of the number to which the register is set. But, since such a setting would cause the total number inserted by all the registers to be one count less than the required complement number, an additional pulse is subsequently fed into the counter whereby the true complement number is inserted.

Figure 2:
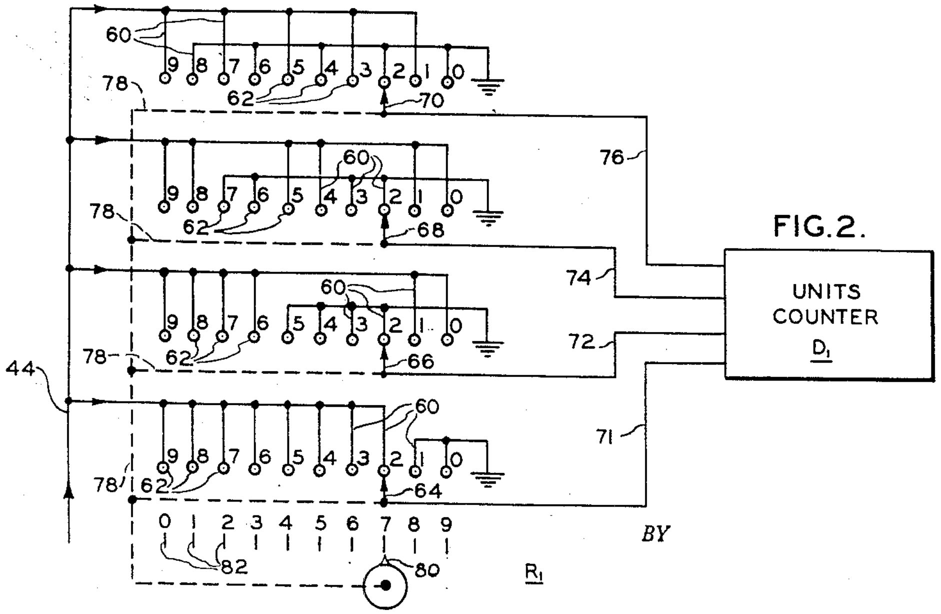
Fig. 2 is a circuit diagram of the switching registers for presetting the counters in Fig. 1.

Reference is now made to Fig. 2, which shows counter decade $D_1$ and the circuit of register $R_1$. Since all of the decades $D_1$ to $D_4$ and registers $R_1$—$R_4$ in Fig. 1 are usually alike, a description of the operation of one is sufficient. Each of said registers, depending upon the particular design of the decade counter, has one or more groups of leads each group being ten in number. The particular decade and the register connections illustrated in Fig. 2 is of the type illustrated in Fig. 6, page 93, of publication (II), and includes four series-connected binary counter circuits, each modified to operate in accordance with the decimal system. Each register comprises four groups of leads 60, each group being ten in number. Certain of the leads of each group are connected to lead 44 through which the count presetting pulse is applied, the other leads being grounded. Each group of leads are numbered 9, 8, . . . 0, the number indicating that when a connection is made to this particular circuit it will insert a count indicated by said number into the decade.

Each group of leads 60 is connected to a ten-position switch comprising ten stationary contacts 62, to which the respective leads 60 are connected. The switches also comprise movable contacts 64, 66, 68, and 70, respectively connected to leads 71, 72, 74, and 76, which are respectively connected to the four binary counters in the decade.

This type of connection, i. e., one where the presetting pulse from lead 44 is applied to some of the stationary contacts 62 of the switches, is applicable to a system such as described in publication (II), supra. If a system such as described in publication (I), supra, were used, the presetting pulse from lead 44 would be applied to all of the movable contacts of each switch, while the stationary contacts would be connected to the appropriate binary counter circuits of the decade. However, it should be noted that any other suitable circuit connections for presetting a count into the decade counters, whether known or yet to be discovered, may be used, since, as will appear hereinafter, the present invention is not dependent upon the particular circuits used.

As indicated by broken lines 78, all of the movable contacts 64, 66, 68, and 70 are mechanically coupled to a dial including a pointer 80 movable relative to stationary indicia 82, respectively numbered 0, 1, . . . 9, for indicating settings corresponding to numbers 9, 8, . . . 0, respectively, of leads 60, whereby the number of a given indicia 82 and the corresponding lead number to which movable contact is connected will be complements of nine. Thus if pointer 80 is set to indicia 7, as illustrated, the movable contacts will be connected to number 2 of leads 60, whereby the number 2 will be preset into the decade counter.

It should be noted that with system as thus far described, this type of calibration, i. e., one in which the register on each decade counter indicates the nine-complement of the number which is inserted in the counter, as is the case here, will not result in the insertion into the counters of the true complement number C of the total number indicated by the register, for the following reasons: Since each decade counter has a count capacity of ten counts, the total count capacity of all the counters of such a system is $10^n$, where $n$ is the number of decades. But, the number $10^n$ always requires one count more to be inserted than the nine-complement count inserted by the setting of the register. Thus, if the total number of decades is four, and the registers are set to indicate 2,197, as shown in Fig. 1, the number preset into the decades will ordinarily be the 9,999-complement of 2,197, i. e., 9,999−2,197=7,802. But since the total capacity is ordinarily 10,000, the counter will be filled to capacity and provide an output pulse after an additional count of 10,000−7,802=2,198 counts. Thus the setting of the registers to the number 2,197 will ordinarily provide a cycle of operation for every series of 2,198 pulses, which is one more pulse than the registers indicate.

In accordance with my invention, the registers are made to indicate the true count by making the total stable count capacity of the system equal to $(10^n-1)$. Where, as in the case illustrated, four decade counters are used, the total count capacity of the system will be 10,000−1=9,999. This is done by generating, in response to the output pulse from the last decade counter, a single, negative pulse which, after the initial count controlled by the registers is set up in the system, is applied to the input lead 14, whereby one count is inserted in the units decade $D_1$ in addition to those inserted by registers $R_1$ to $R_4$. This is done by applying the pulse output of delay circuit 24 over a lead 50 to a second delay circuit 52, which further delays the pulse. This delayed pulse is applied to a pulse generator 56 which, in response to said delayed pulse, generates a negative pulse 58 which is applied, through the upper position of a two position switch 57 and lead 12 to units counter $D_1$. Thus one extra count is inserted into the counter in addition to those inserted under the control of the registers $R_1$ to $R_4$, whereby the total count P indicated by the registers will insert the true complement count into the counter system.

To facilitate the starting of the system, pulse generator 56 is provided with a manually operable key 55 which, upon each actuation thereof, causes the pulse generator to emit a single negative pulse 58. To start the initial counting operation, switch 57 is moved to its lower position. Key 55 is then actuated and a single pulse 58 will be applied over lead 59 to a phase-inverting amplifier 61, and then through lead 44 to the registers $R_1$ to $R_4$ to preset the counters at the starting count determined by the register settings. Switch 57 will then be returned to its upper position, as shown, and key 55 will be actuated again so that a pulse 58 will be applied to the units counter $D_1$, whereby one additional count will be added to that inserted through the registers. It is obvious that a single, multi-contact switch can be used in place of switches 55 and 57 to provide the sequential functions above described upon a single actuation. In addition, the manual pulse injection circuit can be independent of pulse generator 56.

It will be evident that the type of calibration of the registers herein is suitable for any type of presettable counter system regardless of its construction or design, since the present invention merely involves the calibration of the register dial of each decade to indicate the nine complement of the number preset into the decade, and is independent of the circuit design.

The combined delay time provided by delay circuits 24 and 52 should preferably be less than the interval $t$ between pulses 14. However, this combined delay may obviously be greater than interval $t$, provided the pulse 58 does not coincide with any of pulses 14, since it is immaterial in what order the extra count is inserted. It is merely necessary to add the extra count prior to the final count of the counting cycle. The order of operation of the circuits controlled by the output pulse from the final counter $D_4$ is preferably as follows: First, a blanking pulse is applied through leads 32, 34, 36, and 38 to turn all the counter circuits to "off" condition. Second, electronic switch 42 sends a pulse through registers $R_1$ to $R_4$ to decades $D_1$ to $D_4$ to start said decades at the desired initial count. Third, pulse generator 56 generates a pulse 58 and applies it to the units counter to increase the count inserted by the registers by unity.

It should be noted that the first of the above operations, i. e., the initial blanking operation, is necessary or desirable only for the type of counter circuit wherein certain of the binary counters are in "on" condition at the zero or full count of the system. An example of such circuit is illustrated in publication (II), supra. With other circuits, such as those illustrated in publication (I), supra, all of the binary counters are already in "off" condition at the zero or full count of the system. In such a case, the blanking step is unnecessary, and the components 24, 28, and 30 in Fig. 1 can be eliminated. Finally, if relay 48 is non-electronic, which is usually the case when used to control mechanical processes, then it is likely to be relatively slow operating, in which case this relay can be used to actuate the pulse generator 56, thus permitting the elimination of components 52 and 54. In short, any type of control circuits which will provide the above described sequence of operations may be used.

Although the invention has been illustrated in connection with a counter system operating in accordance with the decimal system of digits, it is obviously applicable to systems using a scale of any number of digits. Thus, if a numbering system using the eight digits 7, 6, . . . 0 were used, such as that illustrated in the patent of Ohmer R. Miller, No. 2,407,320, issued September 10, 1946, then each register would have eight positions having calibration numbers which are respectively seven-complements of the numbers preset into the counter. Here, too, the number indicated by all the registers would be the desired counting cycle of the counter.

When the invention is applied to system using different numbers of digits, a decimal number is first converted into its equivalent number in the other system, then said equivalent number is inserted into the registers. A two-order counter, having eight digits, zero to seven, may be used as an example. If it is desired to have such a counter full after 36 pulses (decimal), then this number is first converted into its scale-of-eight equivalent, which is 44. Setting the number 44 into said registers will preset the $(N-1)$ complement plus 1 into the counters, which amounts to 33 plus 1=34 (scale 8); hence a further application of 36 pulses (decimal), which is designated 44 in the scale-of-8 system, will step the counter to the 00 condition.

In general, if the counter system has $n$ cascaded sections, each having a capacity of N digits from zero to $(N-1)$, where N is any number, providing a total count capacity of $N^n$ counts, then each counter in the system will be provided with a register having N selectively actuated count-inserting or presetting positions for respectively inserting counts of $(N-1)$ to zero into the counter, said positions being marked with indicia, respectively numbered zero to $(N-1)$. In other words, the number inserted into the counter and the corresponding indicia number on the register will be complements of $(N-1)$. To preset such a counter system to operate in counting cycles of P counts, P being less than the total capacity $N^n$, the total number set up on all the registers will indicate P, while the actual number inserted by said registers into the counter system will be $(N^n-P-1)$. In accordance with my invention, an additional count of "one," or fugitive digit, is automatically added so that the resultant number inserted will be $(N^n-P)$, which is the true complement of the number P.

Since the registers directly indicate the number of additional counts necessary for the counter system to deliver an output pulse and then recycle itself, the setting of all the registers to zero position indicates that, once a pulse appears in the output of the last counter, the counter system will recycle itself without any additional pulses added; in other words, the system will act as a self-excited oscillator or pulse generator. This will be clear from the following considerations: With all the registers set to zero, and switch 57 in the lower position, the actuation of key 55 will insert a count of 9,999 into the system. Then, by returning switch 57 to the upper position and adding another pulse, either from an external source or by again actuating key 55, the counter system will be full and deliver an output pulse which will again insert a count of 9,999 into the counter system and then automatically actuate pulse generator 56 to cause it to feed another to the input of the counter system, whereupon the latter would be full again, and the same cycle of operation would be repeated. Thus the system would operate as a pulse oscillator, with a repetition frequency solely determined by the time constants of the system, viz., the time constants of the circuits in the counters, the delay time of circuits 24 and 52, etc. By making the delay circuits adjustable the pulse repetition frequency can be varied.

Although one set of registers has been illustrated, any number of sets may be used to provide alternate counts of P, P', and P'', etc., in the same manner as in the prior art systems exemplified by those described in publications (I) and (II), supra.

In a practical embodiment of the invention, the usual count indicators, such as neon tubes, may be incorporated in the counter circuits, so that the operation of the registers may be checked from time to time to see whether the true complement of the number indicated on the registers is being inserted, or to aid in locating faults.

It will be seen that the method of calibrating the presetting registers set forth herein is applicable to any type of counter construction, whether it is mechanical, electrical, electromechanical, electromagnetic, electronic, or any combination of these or other types. The publications cited herein are merely illustrative of some of the prior art devices to which my invention is applicable; and to the extent that they show specific embodiments of components described herein, and/or additional features that may be incorporated as part of my invention, these publications as well as the bibliography therein are to be considered a part of this specification.

Although the registers shown herein are of the multi-position dial-switch type, it is obvious that conventional push-button or plug and jack types of registers or other equivalents can be used instead. It is also obvious that the registers can be of the type controlled by punched cards or tapes, or other types of recordings which are prepared by machines having selectively controlled keys, each calibrated to indicate, as do the dials herein, the nine-complement of the number recorded. The term "register" as used herein is to be construed to cover all such modes of construction.

A few examples of the practical uses of the system herein will now be given. For instance, machine 200 can be a recorder in which time marks are recorded at precisely spaced intervals. Switch 11 is moved to connect the counter system to oscillator 100 of constant high frequency. After a predetermined number of cycles, as determined by the presetting of the counter system, a single output pulse is delivered by the counter, which pulse will operate the time-mark recording mechanism of the recorder. When operated in this manner, the counter system herein operates essentially as a variable interval timer, or as a frequency divider with a division factor which is continuously variable in increments of unity.

As another example, machine 200 can be an automatic machine for filling bottles with a predetermined number of pills. As each pill is dropped into the bottle, it interrupts a light beam focused on a photoelectric cell, whereby a pulse will be generated as each pill is dropped. These pulses will then be applied to the counting system herein, which can be preset to deliver an output pulse after any predetermined number of input pulses. The output pulse will then interrupt the feeding of pills until a new bottle has been moved into position. During the interruption of the feeding of pills no pulses 14 will be generated until the new bottle has been moved into position, at which time the counter is recycled and starts a new counting cycle. However, in a mechanism of this type, involving control of mechanical elements which are relatively slow compared to speed of operation of the electronic components herein, it is important to ensure that the recycling of the counter system be delayed until the cycling of the mechanism 200 is completed. To ensure this delay, the relay 48 should be connected directly to the output of the last counter $D_4$, i. e., to lead 22, instead of to lead 46. Sufficient delay should then be provided by delay circuit 24 to delay the operation of the succeeding components until the mechanism has operated. Thus, in the particular example here given, the delay in circuit 24 should be such that the feeding of pills and the resultant generation of pulses 14 is stopped before counter-recycling elements controlled by the output of delay circuit 24 operate. The counter-recycling should then be accomplished just before the machine starts a new cycle which again starts the generation of pulses 14 and initiates a new cycle of operation of the counter.

Numerous other uses of the system herein are possible, some of which are described in the above-cited publications.

While there have been described what are at present considered preferred embodiments of my invention, it will be obvious to those skilled in the art that various changes and modifications may be made therein without departing from the invention, and it is aimed in the appended claims to cover all such changes and modifications as fall within the true spirit and scope of the invention.

I claim:

1. A self-cycling, electric predetermined counter having N stable states successively induced by successive variations of potential applied to the input circuit thereof, a presetting register for said counter having N selectable counter presetting positions for selectively presetting the counter to any one of its stable states in response to a pulse applied thereto, said positions being calibrated in terms of the $(N-1)$ complement of the count preset thereby, means responsive to said predetermined counter reaching a predetermined counting state to provide a pair of time-spaced pulses, means for impressing one of said pair of pulses upon said input circuit, and a circuit including said register and responsive to the other of said pair of pulses to preset into said counter a count equal to the $(N-1)$ complement of the number set up on said registers.

2. A self-cycling electric predetermined counter system having a plurality of stable states successively induced by successive variations of potential applied thereto, said predetermined counter system comprising $n$ cascade-connected denominational counters, an input circuit for only the lowest denomination counter adapted to be connected to a source of varying potential, a presetting register for each of said counters, said register having N selectable counter presetting positions for selectively presetting the counter to any one of its stable states in response to a single pulse applied thereto, said positions being calibrated in terms of the $(N-1)$-complements of the counts preset thereby, means responsive to the impression of $(N^n-1-C)$ potential variations on said input circuit to provide a pair of time-spaced pulses, a circuit for impressing one of said pair of pulses upon the count presetting registers to preset each of said counters to initial counts equal to the $(N-1)$ complement of the number set up on the respective registers, and means for impressing the other of said pair of pulses upon said input circuit, wherein C is the total number preset into said counter system by said registers.

3. In combination with a counter system comprising $n$ denominationally-related decade counters connected in cascade and adapted to have a source of actuating pulses coupled solely to the lowest denomination counter: a count-presetting circuit including $n$ registers, each being selectively settable to ten positions respectively numbered zero to nine, means controlled by the setting of said registers to any number to preset into said system a count equal to the $(10^n-1)$ complement of said number, and means independent of said count-presetting circuit and of said source to thereafter add a count of "one" into the lowest denomination counter.

4. A pulse counter system comprising a plurality of cascade-connected, denominational counters each having N stable counting states representative of counts of zero to $(N-1)$, a presetting register for each of said counters, each register having N counter presetting positions for selectively presetting its counter to any one of its stable states in response to a single pulse applied thereto, said positions being calibrated in terms of the $(N-1)$-complements of the counts preset thereby, a source of operating pulses coupled to said system, and pulse-generating means other than said source to first apply a single pulse to all of said registers simultaneously, thereby to simultaneously preset said counters to counts equal to the $(N-1)$ complements of the numbers set up on their respective registers, and thereafter impress solely a single pulse upon the lowest denomination counter.

5. A self-cycling, predetermined counter system having a plurality of stable states successively induced by successive pulses applied thereto, said system comprising $n$ cascade-connected counters for counting successively higher denominations of a number of pulses applied thereto, each of said counters having ten stable counting states, an input circuit for said pulses coupled to the lowest denomination counter, a presetting register coupled to each of said counters, each register having ten count-presetting positions for selectively presetting its counter to any one of its stable states in response to a single pulse applied thereto, said positions of all the registers being calibrated in terms of the nine-complements of the counts preset thereby, means responsive to said predetermined counter system reaching a counting state of $10^n$ to provide a first pulse, a circuit including said registers and responsive to said first pulse to preset said predetermined counter system to a count equal to the $(10^n-1)$ complement of the total number set up on all said registers, a second circuit responsive to said first pulse and including delay means therein to provide a second pulse which is delayed relative to said first pulse, and means to impress said second pulse upon said input circuit.

6. A self-cycling, electric, predetermined counter system having a plurality of stable states successively induced by application thereto of successive variations of potential, said predetermined counter system comprising a plurality of cascade-connected denominational counters, each providing N stable counting states, an input circuit for only the lowest denomination counter, a source of varying potential connected to said input circuit, a presetting register for each of said counters, each register having N selectable count-presetting positions for selectively presetting its counter to any one of its stable states in response to a pulse applied thereto, said positions being calibrated in terms of the $(N-1)$ complements of the counts preset thereby, means independent of said source to provide a pair of time-spaced pulses upon each actuation thereof, means for impressing the first-occurring of said pair of pulses to said registers to preset each of said counters to an initial count equal to the $(N-1)$ complement of the number set up on its register, and means for impressing the second-occurring of said pair of pulses upon said input circuit.

7. A self-cyling, predetermined counter system having a plurality of stable states successively induced by application thereto of successive variations of potential having at least a predetermined time interval between the peaks thereof, said predetermined counter system comprising a plurality of cascade-connected denominational counters, each providing N stable counting states, an input circuit for only the lowest denomination counter adapted to be connected to a source of varying potential, a presetting register for each of said counters, each register having N selectable count-presetting positions for selectively presetting its counter to any one of its stable states in response to a pulse applied thereto, said positions being calibrated in terms of the $(N-1)$ complements of the counts preset thereby, output means coupled solely to the highest denomination counter and responsive to said predetermined counter system reaching a counting state $N^n$ to provide a first pulse, means for impressing said first pulse upon said registers to preset each of said counters to an intitial count equal to the $(N-1)$ complement of the number set up on its register, means coupled to said output means for providing a second pulse which is delayed relative to first pulse by an amount which is less than said predetermined time interval, and means for impressing said second pulse upon said input circuit.

8. A self-cycling, predetermined counter system having a plurality of stable states successively induced by application thereto of successive variations of potential having at least a predetermined time interval between the peaks thereof, said predetermined counter system comprising a plurality of cascade-connected denominational counters, each providing N stable counting states, an input circuit for only the lowest denomination counter adapted to be connected to a source of varying potential, a presetting register for each of said counters, each register having N selectable count-presetting positions for selectively presetting its counter to any one of its stable states in response to a pulse applied thereto, said positions being calibrated in terms of the $(N-1)$ complements of the counts preset thereby, output means coupled solely to the highest denomination counter and responsive to said predetermined counter system reaching a counting state of $N^n$ to provide a first pulse, means coupled to said output means for providing a pair of time-spaced pulses, both of which are delayed relative to said first pulse by an amount which is less than said predetermined time interval, means for impressing solely the first-occurring of said pair of pulses upon said registers to preset each of said counters to an initial count equal to the $(N-1)$ complement of the number set up on its register, and means for impressing the second-occurring of said pair of pulses upon said input circuit.

9. In combination with a source of varying potential, a self-cycling, electronic, predetermined counter system having a plurality of stable states successively induced by successive variations of potential the peaks of which are spaced by at least a predetermined interval, said predetermined counter system consisting of a plurality of cascade-connected denominational counters each having N stable counting states, an input circuit for only the lowest denomination counter connected to said source, a presetting register for each of said counters, said register having N selectable counter presetting positions for selectively presetting its counter to any one of its stable states in response to a single pulse applied thereto, said positions being calibrated in terms of the $(N-1)$ complements of the counts preset thereby, means controlled only by the highest denomination counter when it reaches its highest counting state to provide at least a pair of pulses one of which is delayed relative to the other by an interval which is less than said predetermined interval, means controlled by the earlier of said pair of pulses to stop the application of potential from said source to said counter system and apply a pulse to said registers to preset all of said counters to initial counts equal to the $(N-1)$ complements of the numbers set up on their respective registers, and means controlled by the later of said pair of pulses for impressing a single pulse upon said input circuit.

BENJAMIN FOX.

References Cited in the file of this patent

UNITED STATES PATENTS

| Number | Name | Date |
|---|---|---|
| 2,373,134 | Massonneau | Apr. 10, 1945 |
| 2,402,989 | Dickinson | July 2, 1946 |
| 2,403,873 | Mumma | July 9, 1946 |
| 2,410,156 | Flory | Oct. 29, 1946 |
| 2,428,084 | Lambert | Sept. 30, 1947 |
| 2,560,968 | MacSorley | July 17, 1951 |

OTHER REFERENCES

Richard J. Blume: "Predetermined Counter for Process Control," Electronics, February 1948, pages 88–93, inclusive (corrections noted in Electronics, April 1948, page 262).